United States Patent
Cheung

(10) Patent No.: US 7,551,314 B2
(45) Date of Patent: Jun. 23, 2009

(54) ADJUSTABLE BOUNDING BOX FOR TRANSPARENT SCANNER

(75) Inventor: Patrick C. Cheung, Castro Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 967 days.

(21) Appl. No.: 10/916,184

(22) Filed: Aug. 11, 2004

(65) Prior Publication Data

US 2006/0033964 A1    Feb. 16, 2006

(51) Int. Cl.
*G06F 15/00* (2006.01)
*H04N 1/387* (2006.01)
*H04N 1/38* (2006.01)
*H04N 1/04* (2006.01)

(52) U.S. Cl. .................. 358/1.2; 358/452; 358/453; 358/463; 358/474

(58) Field of Classification Search .................. 358/1.2, 358/452, 453, 463, 474; 382/276
See application file for complete search history.

(56) References Cited

U.S. PATENT DOCUMENTS

| | | | | |
|---|---|---|---|---|
| 4,908,875 A * | 3/1990 | Assael et al. | ................ | 382/272 |
| 6,204,937 B1 * | 3/2001 | Takeda | ................ | 358/475 |
| 6,271,939 B1 | 8/2001 | Hu et al. | ................ | 358/497 |
| 6,470,099 B1 | 10/2002 | Dowdy et al. | ................ | 382/287 |
| 6,587,231 B1 * | 7/2003 | Sung | ................ | 358/497 |
| 6,661,539 B1 | 12/2003 | Nee | ................ | 358/474 |
| 6,785,025 B1 * | 8/2004 | Dawe et al. | ................ | 358/474 |
| 6,833,936 B1 * | 12/2004 | Seymour | ................ | 358/473 |
| 6,870,648 B2 * | 3/2005 | Sesek et al. | ................ | 358/488 |
| 6,892,945 B2 * | 5/2005 | Shishido | ................ | 235/454 |
| 7,221,487 B2 * | 5/2007 | Sesek et al. | ................ | 358/488 |
| 2002/0054715 A1 * | 5/2002 | Os et al. | ................ | 382/276 |
| 2003/0095268 A1 * | 5/2003 | Uribe | ................ | 358/1.1 |
| 2005/0094216 A1 * | 5/2005 | Wu | ................ | 358/474 |

\* cited by examiner

*Primary Examiner*—Edward L Coles
*Assistant Examiner*—Thomas J Lett
(74) *Attorney, Agent, or Firm*—Oliff & Berridge, PLC

(57) ABSTRACT

An apparatus capable of modification of an image prior to scanning by a scanning device having a scanning element, a viewing surface, a glass platen, and a controller having memory capability, includes opaque adjustable bounding strips. The bounding strips are viewable through the viewing surface of the scanning device and are located between the inside surface of the glass platen and the scanning element. The bounding strips are movable to identify a selected portion of an image to be scanned. The apparatus also includes software for performing a scan of the selected portion of the image and identifying its location, based on the location of the adjustable bounding strips.

17 Claims, 3 Drawing Sheets

ADJUSTABLE BOUNDING BOX FOR TRANSPARENT SCANNER

INCORPORATION BY REFERENCE

The following U.S. patents are fully incorporated herein by reference: U.S. Pat. No. 6,271,939 ("Transparent and Flatbed Scanner"); U.S. Pat. No. 6,470,099 ("Scanner with Multiple Reference Marks"); and U.S. Pat. No. 6,661,539 ("Vertically Oriented Document Scanner").

BACKGROUND

This disclosure relates generally to transparent flatbed scanning systems and more particularly relates to a method and system to modify image placement, size, and composition through use of an adjustable bounding box.

Scanning systems are typically utilized to convert paper-based objects, such as texts and graphics to an electronic format which can be analyzed, distributed, and archived. However, a typical flatbed scanner may be inconvenient for such tasks as scanning pages of a thick book, whose thickness results in the scanner cover being only partially closed, resulting in an image with undesirable artifacts. Additionally, because the image is scanned face down, the user is unable to project in advance what a resultant image will be until the image is actually generated. For example, if the user desires to reproduce only a portion of an image, there is no convenient way for the user to align the scanning document properly prior to scanning. This is particularly true in the case of a newspaper, in which the back side of a page provides no referents for location of material on the front side of a page. Or if a user wants to superimpose the image of one document onto that of another document in a precise location, alignment of each document is difficult, since both are face down on the image platen of the scanner. While overhead scanners of various types have been introduced to scan documents, particularly books, in a face-up position, the size and weight of these overhead scanners render them undesirable for the average consumer.

These problems have been partially addressed by U.S. Pat. No. 6,271,939 to Hu et al. ("Transparent and Flatbed Scanner"), which teaches a portable, stand-alone frame transparent scanner having a cradle including a base and a lid. When rested in the cradle, the frame transparent scanner operates as a regular flatbed scanner with the capability of scanning materials face up. Although such transparent scanners provide more flexible scanning capability, they do not resolve the problem of selecting a rectangular section from a scanned original. In existing scanning configurations, it is necessary for a user of a flatbed scanner to utilize a preview image controlled by operation of a mouse. Time delays result from the preview scan time (the scanner travels twice for each original) and subsequent mouse actions and/or magnification steps. The user's attention must alternate between two different tasks: placement of the original and view/operation selection through a computer interface. To enable scanning of multiple originals, each of which has different selection sizes, a more efficient and streamlined approach is desirable.

BRIEF SUMMARY

The disclosed embodiments provide examples of improved solutions to the problems noted in the above Background discussion and the art cited therein. There is shown in these examples an improved apparatus capable of modification of an image prior to scanning by a scanning device having a scanning element, a viewing surface, a glass platen, and a controller having memory capability, includes opaque adjustable bounding strips. The bounding strips are viewable through the viewing surface of the scanning device and are located between the inside surface of the glass platen and the scanning element. The bounding strips are movable to identify a selected portion of an image to be scanned. The apparatus also includes software for performing a scan of the selected portion of the image and identifying its location, based on the location of the adjustable bounding strips.

In another embodiment, there is disclosed a method for modification of an image prior to scanning by a scanning device having a scanning element, a viewing surface, a glass platen, a controller having memory capability, and opaque adjustable bounding strips viewable through the viewing surface and located between the inside surface of the glass platen and the scanning element. The adjustable bounding strips are capable of being moved to identify a selected image to be scanned. The method includes moving the adjustable bounding strips to identify a selected image to be scanned and initiating line scanning with the scanner from a scanner park position. Each line scan generates pixel data, which is examined. A left edge, formed by one of the bounding strips, defines a left edge of the selected image portion to be scanned. A right edge, formed by another of the bounding strips, is also defined. The upper edge of the selected image portion is defined by another bounding strip. A complete set of line scan data is obtained for the area contained by the left, right, and upper bounding strips and the line scan data is saved to memory. The lower edge of the selected image portion, formed by another bounding strip, is located, and line scanning is halted. The scanning element is returned to its park position.

In yet another embodiment, there is disclosed an article of manufacture in the form of a computer usable medium having computer readable program code embodied in the medium which, when the program code is executed by the computer, causes the computer to perform method steps for modification of an image prior to scanning by a scanning device having a scanning element, a viewing surface, a glass platen, a controller having memory capability, and a plurality of opaque adjustable bounding strips viewable through the viewing surface. The bounding strips are located between the inside surface of the glass platen and the scanning element and are capable of being moved to identify a selected image portion to be scanned. The method includes moving the adjustable bounding strips to identify a selected image to be scanned and initiating line scanning with the scanner from a scanner park position. Each line scan generates pixel data, which is examined. A left edge, formed by one of the bounding strips, defines a left edge of the selected image portion to be scanned. A right edge, formed by another of the bounding strips, is also defined. The upper edge of the selected image portion is defined by another bounding strip. A complete set of line scan data is obtained for the area contained by the left, right, and upper bounding strips and the line scan data is saved to memory. The lower edge of the selected image portion, formed by another bounding strip, is located, and line scanning is halted. The scanning element is returned to its park position.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
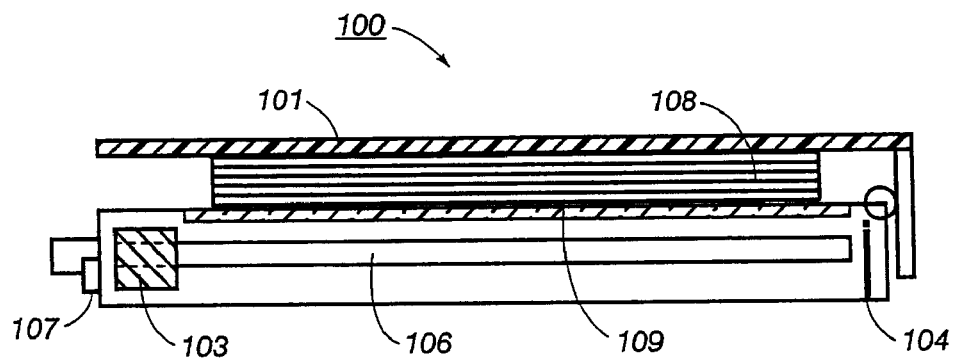
FIG. 1 is a cross-sectional side view of a typical scanning device.

The adjustable bounding box described herein a user may change originals, crop the boundaries of each selection, and issue a scan command, all as a single streamlined task at a transparent scanner. Final image files are all cropped to individual desired boundaries without further editing. Because the scanner element only travels once for each original, since a preview scan is eliminated, there is a fifty percent reduction in mechanical wear to the scanner.

The bounding box integrates a set of strips in the scanner that a user can manually adjust to form a rectangular bounding box over an original document to crop the document to the portion desired by the user. Together with a start button on the scanner's body, a user can change originals, crop the boundaries of each selection, and issue a scan command, all as one streamlined task at the scanner. Thus the user's time is conserved by elimination of waiting for a preview scan and enlarging and fine-tuning the bounding box on the screen. With the adjustable bounding box, it is possible to scan a newspaper column, excluding unwanted texts. Also, when scanning a page from a book, peripheral areas outside the page can be cropped out. While post-processing software can also remove the dark area outside a page, the center-line between opposing pages, or the outer edge of a page where a small section of the page below is exposed, may not be removed properly. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate capabilities for locating the bounding box within a scanner. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Although the method and system described herein are not limited to embedded applications, the following discussion will pertain to embedded systems for purposes of example only. One skilled in the art will appreciate that the provision of sensing bounding box position within a scanner is useful for many scanning applications and types of equipment. Additionally, it may be practiced in a multitude of computing environments.

FIG. 1 illustrates one example of a transparent, cover-based scanner 100. In this example, one or more scan elements 103, one or more guide rails 106, one or more control buttons 107 and interface and control electronics 104 may reside in the cover 101.

As the one or more scan elements 103 move along the one or more guide rails 106 past the image platen 109, the one or more scan elements 103 scan the document 108 in the same manner as conventional scanners. This arrangement allows the user to place the documents 108 face-up on the base of the scanner 100. This improves efficiency in using a cover-based scanner, by enabling the user to view one or more documents in the state that the documents will be scanned. In this arrangement, the scan elements 103, the one or more guide rails 106, the one or more control buttons 107 and the interface and control electronics 104 may be the same as those used in a conventional scanner. An alternate example of a transparent scanner on which the adjustable bounding box may be utilized is taught in U.S. Pat. No. 6,271,939 to Hu et al. ("Transparent and Flatbed Scanner").

Figure 2:
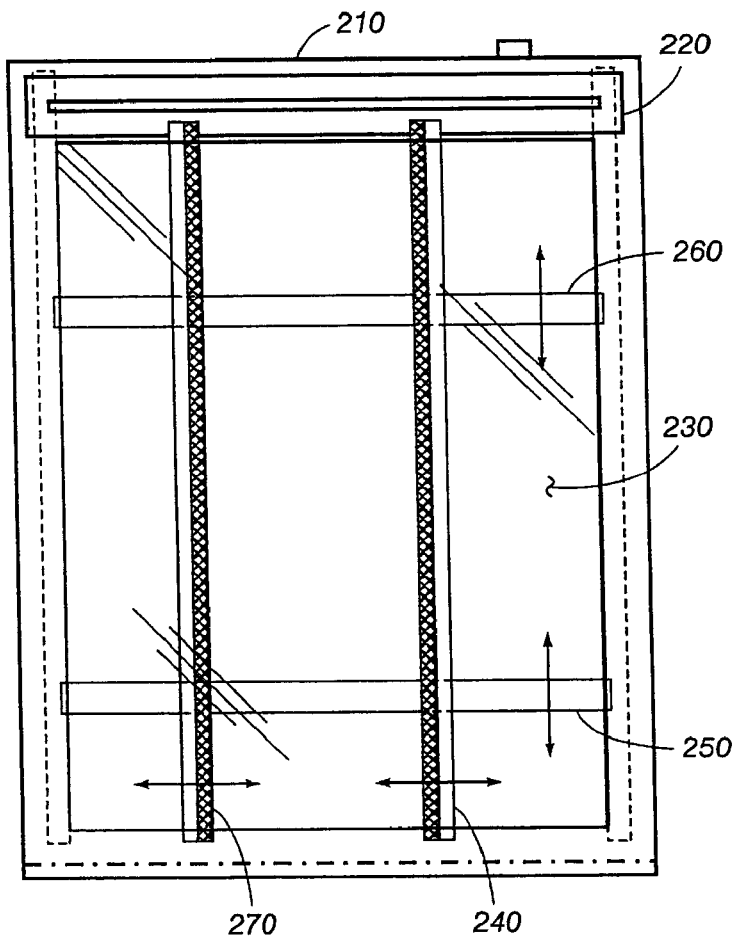
FIG. 2 is a top view of the scanning device of FIG. 1 with an embodiment of the adjustable bounding box.

Turning now to FIG. 2, the user of the scanner can manually position each of the four strips in the bounding box to form a generally rectangular bounding box on top of an original document, separated only by the glass platen Scanner housing 210 includes scanning element 220 and a viewing surface 230. The strips 240, 250, 260, and 270 can be seen without obstruction from the top of the scanner through viewing glass 230. The cropped original can likewise be seen through the viewing glass and through the glass platen. The opaque strips 240, 250, 260, and 270 are located within the gap between the inside surface of the glass platen and the motorized scanning element. Strips 240, 250, 260, and 270 are of a variable thickness sufficient to prevent the strips from bending or folding easily, for example approximately a few thousandths of an inch, and can be fabricated from a variety of materials such as aluminum, steel, and plastic. The strips may be any convenient width, for example approximately 0.5 inches in width. Upper strip 260 and lower strip 250 can be moved along the direction which the scanner element moves. Without loss of generality, it is assumed for the purposes of this discussion that the scanning element is oriented to move from a starting or park position (shown for scanning element 220) to a position on the directly opposed to the park position. Left strip 270 and right strip 240, both of which include white outer margins, move perpendicularly to the movement direction of the scanning element 220. The four strips 240, 250, 260, and 270 thereby form a rectangular bounding box whose sides may be placed anywhere within the extent of the glass platen.

Figure 3:
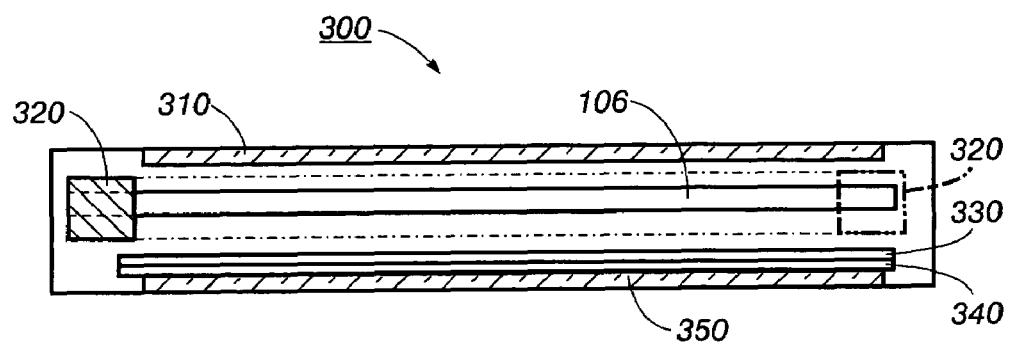
FIG. 3 is a side view of the scanner of FIG. 1 illustrating the placement of one embodiment of the adjustable bounding box.

FIG. 3 illustrates a side view of the scanner with the bounding strips in place between the glass platen 350 and the viewing glass 310. The pair of upper and lower strips 330 are sandwiched between the scanning element 320 and the pair of left and right strips 340. The bounding strips may be confined to slide on two guide rails mounted near the bottom and either one of left or right side of the scanner housing. Tabs connecting to the strips from outside the housing can be nudged by fingers to position the strips as desired. Alternatively, positioning of the strips can be accomplished by manually rotating knobs and strings such as those commonly found on analog devices. The four knobs, two for each direction, can be placed on the bottom and either one of the left or right side of the scanner housing. The latter design is better in keeping dust out of the scanner interior.

Bounding strip placement may also be motorized to move by adapting a motor and gearbox to each of the gear and string mechanisms. In this embodiment, positioning control would be provided by four electrical switches. An advantage of the motorized bounding box adjustment is the ability to maintain the aspect ratio of the box. For example, a desired aspect ratio is first entered through the interface computer; adjustments are then made to the left and upper strips. Then, an adjustment to the lower strip will trigger the right strip to move in the appropriate direction to achieve the desired aspect ratio. A manual placement of strips cannot give the user such an accurate tracking of aspect ratio. Other possible uses of motorized placement of strips include maintaining a desirable constant left-right separation or upper-lower separation of the bounding strips, or both.

Software for rapidly and methodically locating the bounding box as the scanner moves down the page and performing a high quality scan only of the image cropped within the rectangular bounding box may reside with either the scanner itself or with a computer interacting with the scanner.

Figure 4:
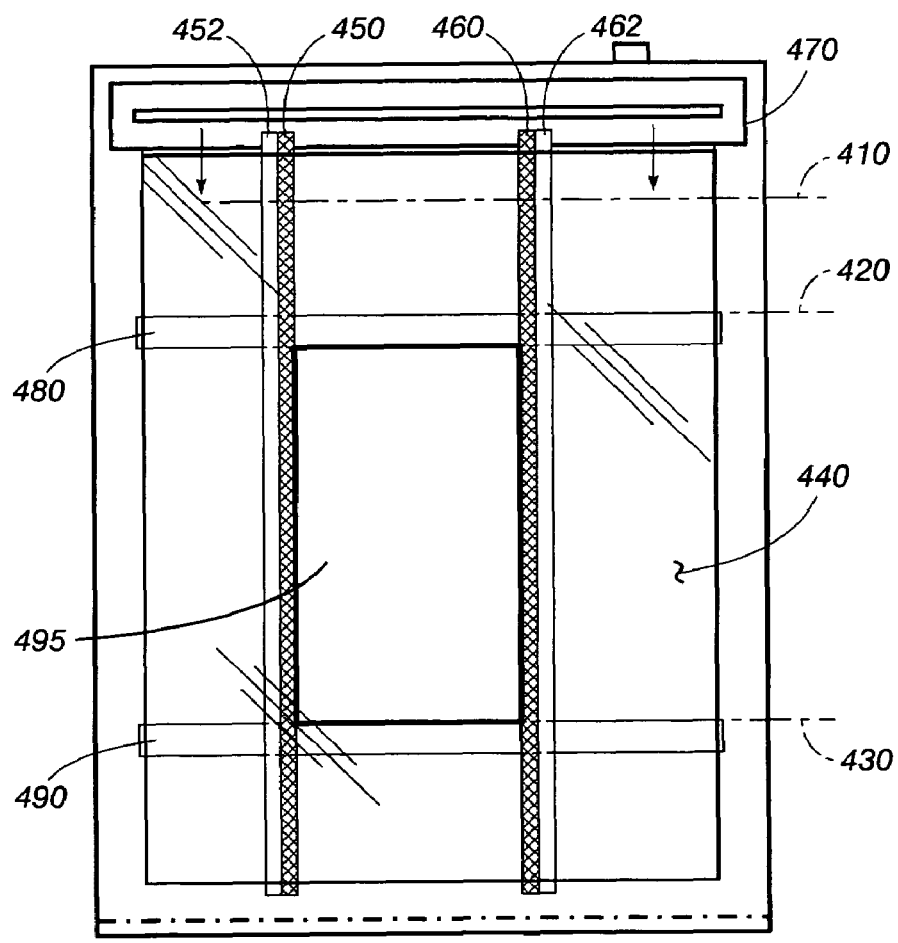
FIG. 4 is a top view of the scanning device depicting determination of the location of the adjustable bounding box relative to the position of the scanning element prior to setting of the scan modes.

Turning now to FIG. 4, determination of the location of the adjustable bounding box relative to the position of the scanning element prior to setting of the scan modes is depicted. As can be observed, the upper edges of bounding strips 450 and 460 are designed to protrude beyond the upper edge of glass platen 440 toward the park location of scanning element 470. It is assumed that the background color of the opaque region viewed through the glass platen is white. The protrusion of the upper edges of bounding strips 450 and 460 beyond glass platen 440 is sufficient such that even if the upper strip 480 is positioned at the edge of the glass platen closest to scanning element 470, the upper strip 480 will not entirely cover the protrusions. As scanning element 470 moves down the page from its parked position and at its highest speed, the first dark objects encountered at 410 are bounding strips 450 and 460, whose inner edges now define the left-right confinement of the bounding box 495. The scanning element continues to move across the platen and register a set of data that is the width of the element (e.g. 8.5 inches in width). The data is processed in real time to identify a completely dark set of data. In this example embodiment, both of strips 450 and 460 include white outer margins 452 and 462, respectively. White outer margins 452 and 462 assist in distinguishing a black area on an original document by breaking the scanned data and distinguishing black areas on the document from the dark edges of bounding strips 450 and 460.

As scanning element 470 reaches upper strip 480, a solid set of white data will appear. There, the element will note the upper edge of the strip and add a prescribed distance to determine where the lower edge of the upper strip 480 is positioned, since bounding strip 480 has a specified minimum width. Some speed compensation may be required, since, depending on scanner design, a full-width scan may note data that are spatially not rectilinear. At the lower edge of the upper strip, the solid set of white data will disappear. Here, the scanning element slows down and starts to perform a high resolution scan at 420. The specific scan resolution may be pre-determined by the user. It is noted that the scanner only needs to assimilate data within the outer margins of left and right bounding strips (including the white margins) 450 and 460. The final image only consists of scan data from the inner margins of the left and right strips 450 and 460. While for the purposes of this embodiment bounding strips 450 and 460 are presented as having white outer margins, it is noted that the bounding strips may take the form of monochromic or bichromic bounding strips.

At this point the software knows the location of the upper, left, and right edges of the bounding box 495. The remaining task is identification of the lower edge where the high resolution scan should end and the scanning element should return to its park position. The software then searches for a complete set of white scan data, including the two sections where the white bands 452 and 462 are located. When the first complete white set of data (bounding strip 490) is located, the lower edge of the bounding box 495 is defined and the scanning element ceases scanning and retracts to its park position.

Figure 5:
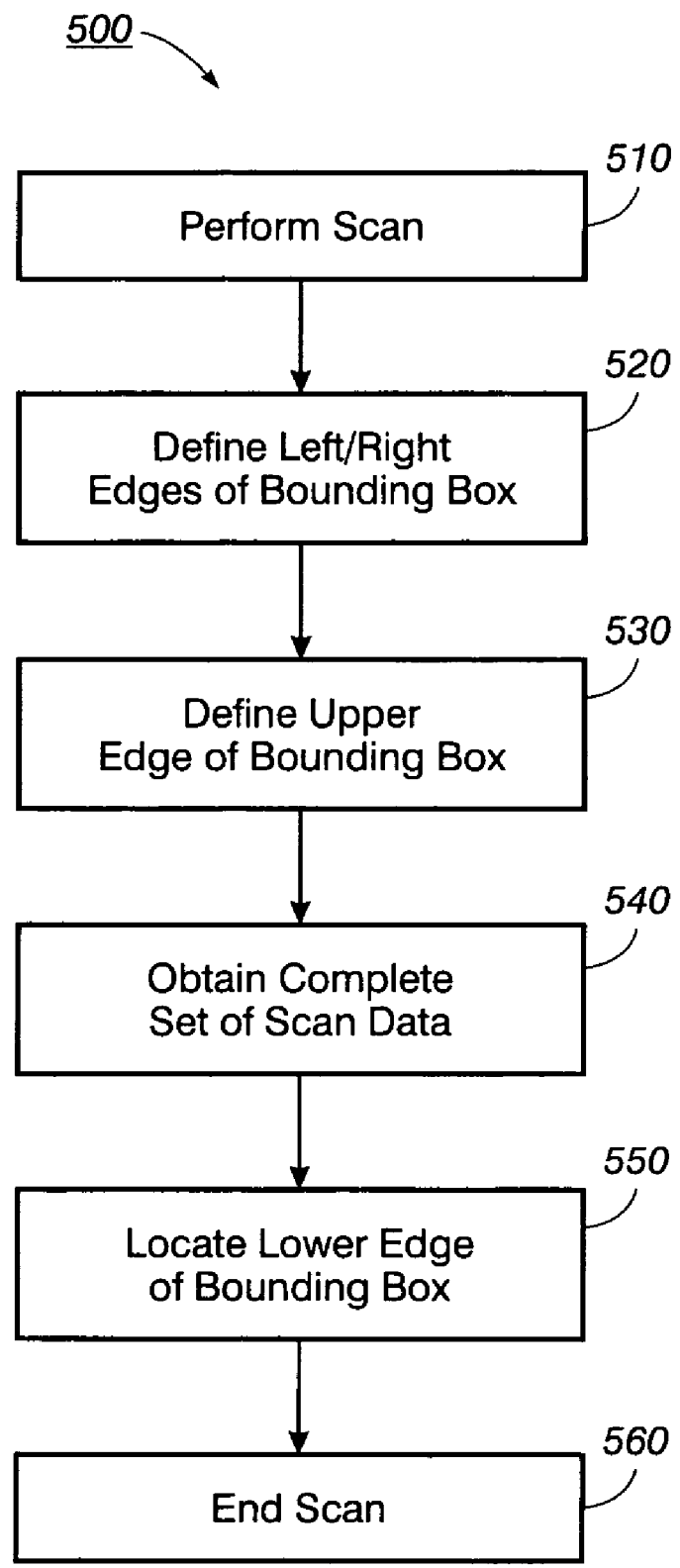
FIG. 5 is a flow chart illustrating the method of operation of one embodiment of the adjustable bounding box.

Turning now to FIG. 5, a flow chart illustrates the method of operation for the adjustable bounding box. At 510, the scanning element moves down across the glass platen from the park position at its maximum speed, scanning the entire width of the platen area having an opaque white background. Line scans are continuously being performed as the element is moving and the firmware continuously examines the pixel data being generated in each line scan. The line data, which may be either monochromic or full color, may be filtered through a running average filter to eliminate jitters in the data. To define the left and right edges of the bounding box at 520, two partial black sets (items 450 and 460 in FIG. 4) are identified from the scan data. As the scanner is operating, four transitions will appear in the line data. The transitions, from left to right in FIG. 4, are a white-to-black (T1), black-to-white (T2), white-to-black (T3), and a final black-to-white (T4) transition. The initial two transitions determine the horizontal (X) position of the left black line. Further, T2 determines the left margin of the image; T3 determines the right margin of the image. These two margins will be used throughout the remainder of the scan to cause the scanner to exclude pixels located outside the two margins in each line from the final image. Thus, T2 and T3 determine the left and right edges of the bounding box respectively.

The scanning element continues to move down the length of the platen, scanning its entire width. The X position is computed to define the middle location of the left vertical black line as $$X\_line = 0.5*(T1+T2).$$

At 530 for each subsequent line scan the method examines the pixel data of X_line to determine if there is a black-to-white transition. When a transition occurs, the scanner has arrived at the top of bounding strip 480 of FIG. 4. The method now searches for a white-to-black transition at X_line. This white-to-black transition is typically found when the scanner moves down a distance equal to the width of the strip, and defines the upper edge (Y1) of the bounding box.

The scanner reduces the speed with which it is moving down the platen and initiates a high-resolution scan at the edge of the upper bounding strip at 540. The specific resolution of the final image may be determined by the user prior to the scan process. For each line scanned, data within the bounds of T2 and T3 is saved to memory. Only the area between the left and right strips, including the white margins, is scanned. This scan is continued while X_line is examined for a black-to-white transition at 550. When this transition occurs, the scanner has arrived at the top edge of the bottom strip, which is also the bottom boundary of the image and the lower edge (Y2) of the bounding box. At this point, all pixel data for the desired image has been collected and saved in memory. The scan is halted at 560 at this lower edge and the scanning element returns to the park position.

While the present discussion has been illustrated and described with reference to specific embodiments, further modification and improvements will occur to those skilled in the art. For example, rather than moving across the surface of the glass platen at varying speeds, the scanning element may move at a constant speed. Also, image data captured by the scanner may be saved to a computer connected to the scanner by any known means or to a memory device within the scanner. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

What is claimed:

1. An apparatus adapted for modification of an image prior to scanning by a scanning device having a scanning element, a viewing surface, a glass platen, and a controller having memory capability, the apparatus comprising:
   the glass platen and the viewing surface separated by a gap that allows the scanning element to pass between the viewing surface and the glass platen,
   a plurality of opaque adjustable bounding strips viewable through the viewing surface and located between an inside surface of the glass platen and where the scanning passes between the viewing surface and the glass platen, the adjustable bounding strips being moved to identify a selected portion of an image to be scanned; and
   means for moving the adjustable bounding strips to select the portion of the image to be scanned,
   wherein the controller controls the scanning device to scan of the selected portion of the image and to identify a location of the selected portion of the image with respect to the overall image.

2. The apparatus according to claim 1, the plurality of adjustable bounding strips comprising four adjustable bounding strips.

3. The apparatus according to claim 2, the four adjustable bounding strips comprising:
   two adjustable bounding strips oriented in a direction parallel with the orientation of the scanning element; and
   two adjustable bounding strips oriented in a direction orthogonal to the orientation of the scanning element.

4. The apparatus according to claim 1, wherein at least one of the adjustable bounding strips is bichromic.

5. The apparatus according to claim 1, wherein at least one of the adjustable bounding strips is monochromic.

6. The apparatus according to claim 1, wherein the selected image portion of the image is generally rectilinear in shape.

7. The apparatus according to claim 1, wherein the means for moving the adjustable bounding strips is a manual means.

8. The apparatus according to claim 1, wherein the means for moving the adjustable bounding strips is a motorized means.

9. A method for modification of an image prior to scanning by a scanning device having a viewing surface and a glass platen separated by a gap, a scanning element in the gap that can pass between the viewing surface and the glass platen and a controller having memory capability, the method comprising:
   placing the scanning device over an image such that the glass platen is facing the image;
   viewing the image through the viewing surface, the gap and the glass platen;
   moving at least one of a plurality of opaque adjustable bounding strips viewable through the viewing surface and located between the inside surface of the glass platen and where the scanning element to identify a selected portion of the image to be scanned passes;
   initiating line scanning with the scanner from a scanner park position, each line scan generating pixel data;
   examining the pixel data generated in each line scan;
   defining a left edge of the selected portion of the image to be scanned, the left edge being defined by at least a first one of the plurality of opaque adjustable bounding strips;
   defining a right edge of the selected portion of the image to be scanned, the right edge being defined by at least a second one of the plurality of adjustable bounding strips;
   defining an upper edge of the selected portion of the image to be scanned, the upper edge being defined by at least a third one of the plurality of adjustable bounding strips;
   obtaining a complete set of line scan data within an area between the first one of the plurality of adjustable bounding strips, the second one of the plurality of adjustable bounding strips, and the third one of the plurality of adjustable bounding strips;
   saving the complete set of line scan data to memory within the controller;
   locating a lower edge of the selected portion of the image to be scanned, the lower edge being located by at least a fourth one of the plurality of adjustable bounding strips; and
   halting the line scanning of the selected portion of the image to be scanned when the located lower edge of the selected portion of the image to be scanned is reached by the scanner.

10. The method according to claim 9, wherein initiating line scanning from a scanner park position is performed at a maximum speed of the scanner.

11. The method according to claim 9, wherein defining the left edge of the selected portion of the image to be scanned comprises identifying white-to-black and then black-to-white transitions in the pixel data.

12. The method according to claim 9, wherein defining the right edge of the selected portion of the image to be scanned comprises identifying white-to-black and black-to-white transitions in the pixel data.

13. The method according to claim 9, wherein defining the upper edge of the selected portion of the image to be scanned comprises identifying at least one black-to-white and white-to-black transition in the pixel data.

14. The method according to claim 9, wherein locating the lower edge of the selected portion of the image to be scanned comprises identifying black-to-white transition in the pixel data.

15. The method according to claim 9, the line scanning further comprising filtering the line data through a running average filter.

16. The method according to claim 9, wherein obtaining the complete set of line scan data within the area the first through third adjustable bounding strips comprises a high resolution scan of the area.

17. An computer usable medium having computer readable program recoded thereon which, when the program is executed by a computer causes the computer to perform method steps for modification of an image prior to scanning by a scanning device having a viewing surface and a glass platen separated by a gap, a scanning element in the gap that can pass between the viewing surface and the glass platen and a controller having memory capability, the method comprising:

moving at least one of a plurality of opaque adjustable bounding strips viewable through the viewing surface and located between the inside surface of the glass platen and where the scanning element to identify a selected portion of an image to be scanned passes, the image being viewable through the viewing surface the gap and the glass platen when the scanning device is positioned over the image such that the glass platen is facing the image;

initiating line scanning with the scanner from a scanner park position, each line scan generating pixel data;

examining the pixel data generated in each line scan;

defining a left edge of the selected portion of the image to be scanned, the left edge being defined by at least a first one of the plurality of adjustable bounding strips;

defining a right edge of the selected portion of the image to be scanned, the right edge being defined by at least a second one of the plurality of adjustable bounding strips;

defining an upper edge of the selected portion of the image to be scanned, the upper edge being defined by at least a third one of the plurality of adjustable bounding strips;

obtaining a complete set of line scan data within an area between the first one of the plurality of adjustable bounding strips, the second one of the plurality of adjustable bounding strips, and the third one of the plurality of adjustable bounding strips;

saving the complete set of line scan data to memory within the controller;

locating a lower edge of the selected portion of the image to be scanned, the lower edge being located by at least a fourth one of the plurality of adjustable bounding strips; and halting the line scanning of the selected portion of the image to be scanned when the located lower edge of the selected portion of the image to be scanned is reached by the scanner.

\* \* \* \* \*